June 23, 1970 M. SCHWARTZ ETAL 3,516,739
STRIP FILM PROJECTOR
Filed Aug. 11, 1967 7 Sheets-Sheet 4
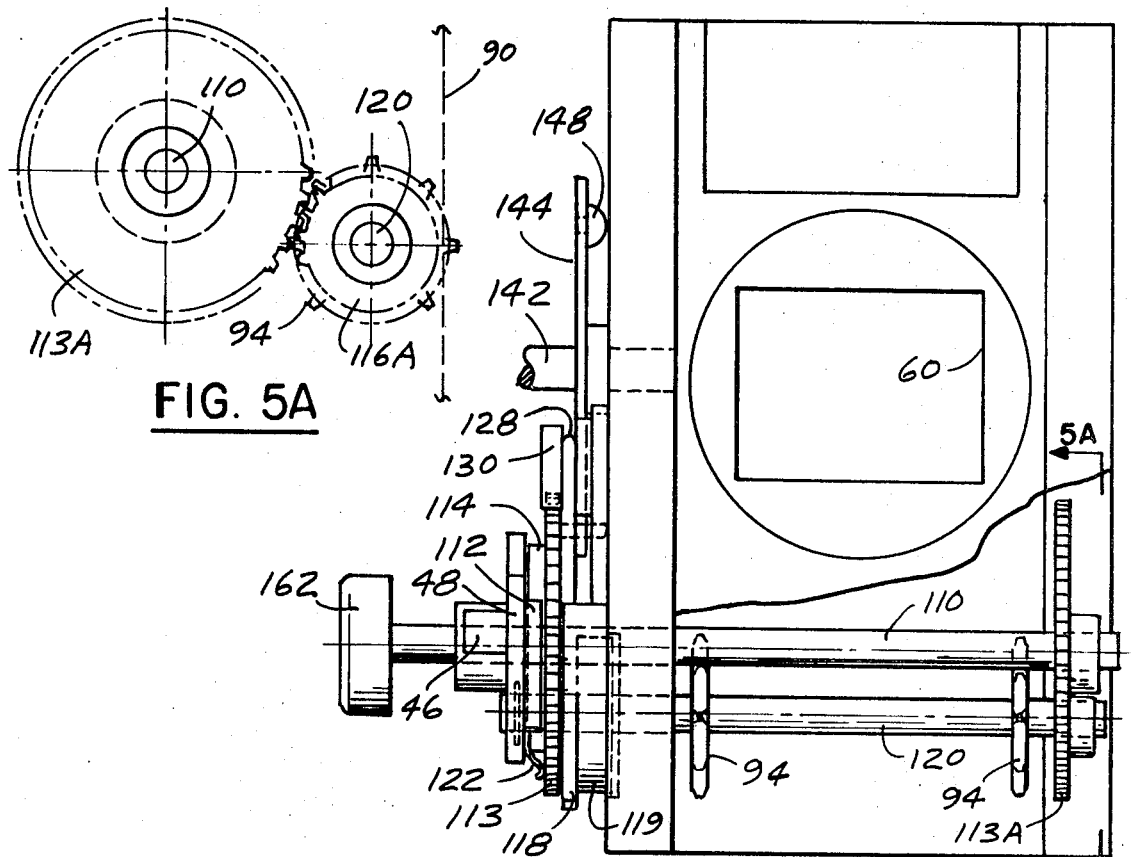
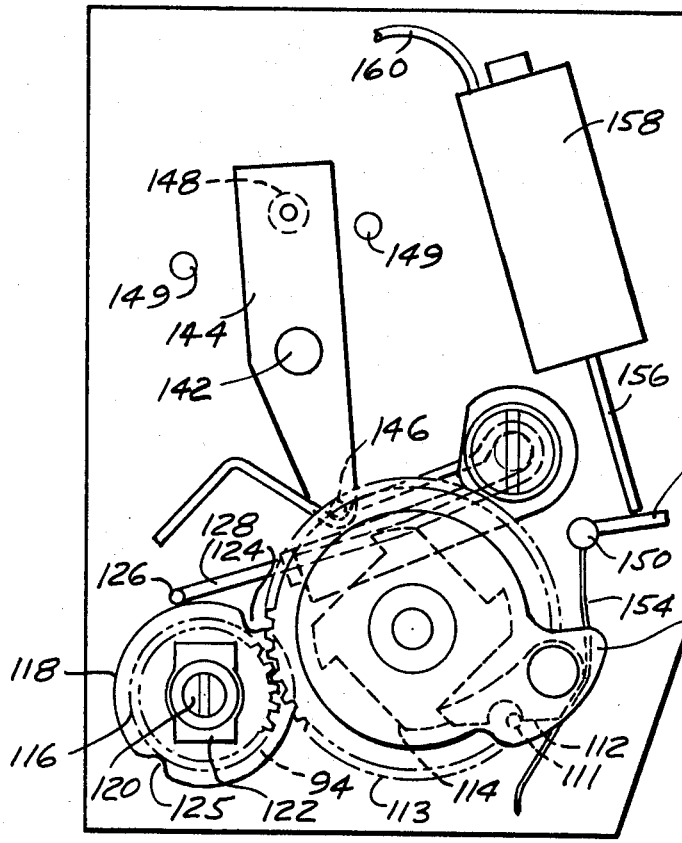
INVENTORS
MORRIS SCHWARTZ
WILLIAM CASTEDELLO
BY EDWARD K. KAPRELIAN
Hane and Baxley
ATTORNEYS

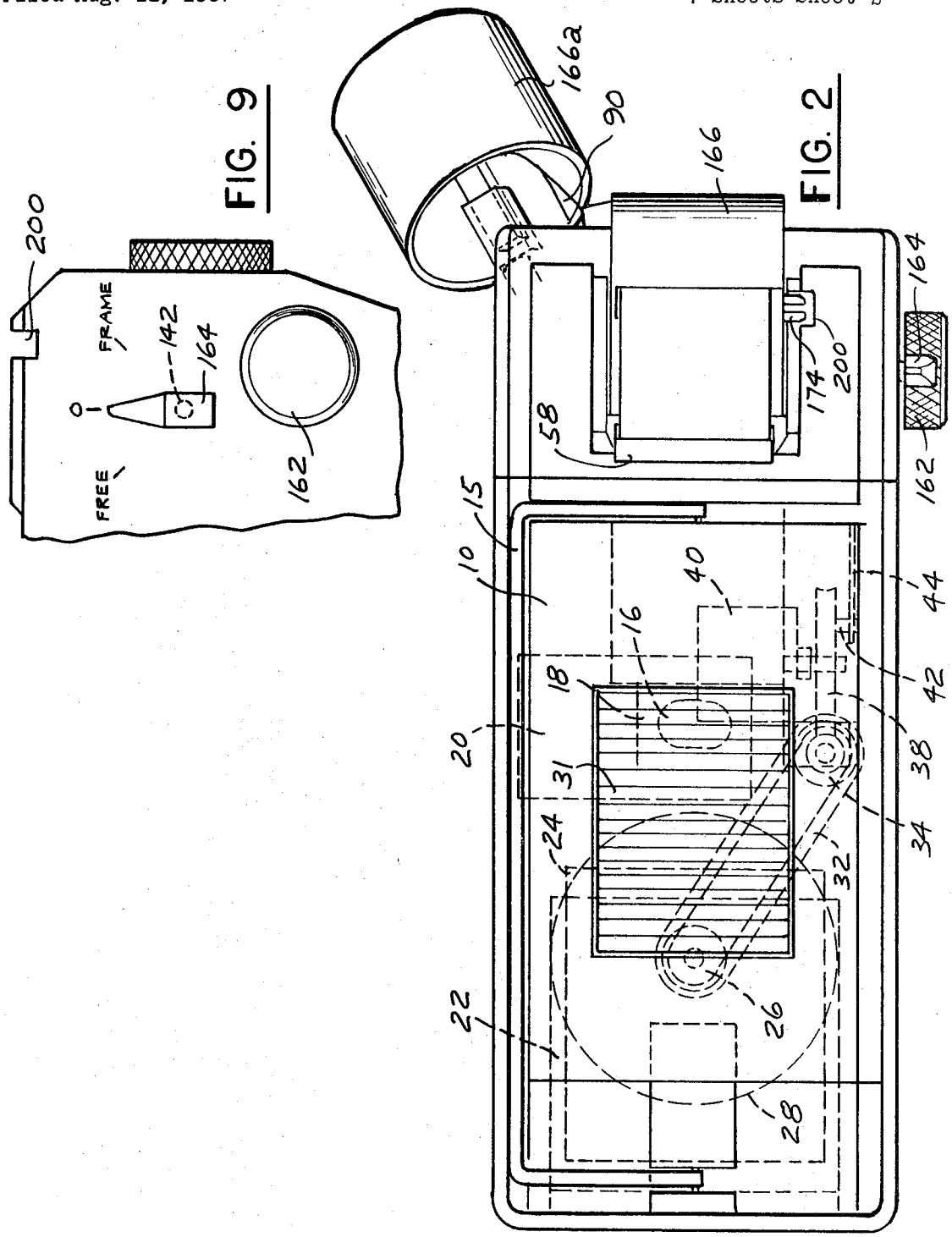

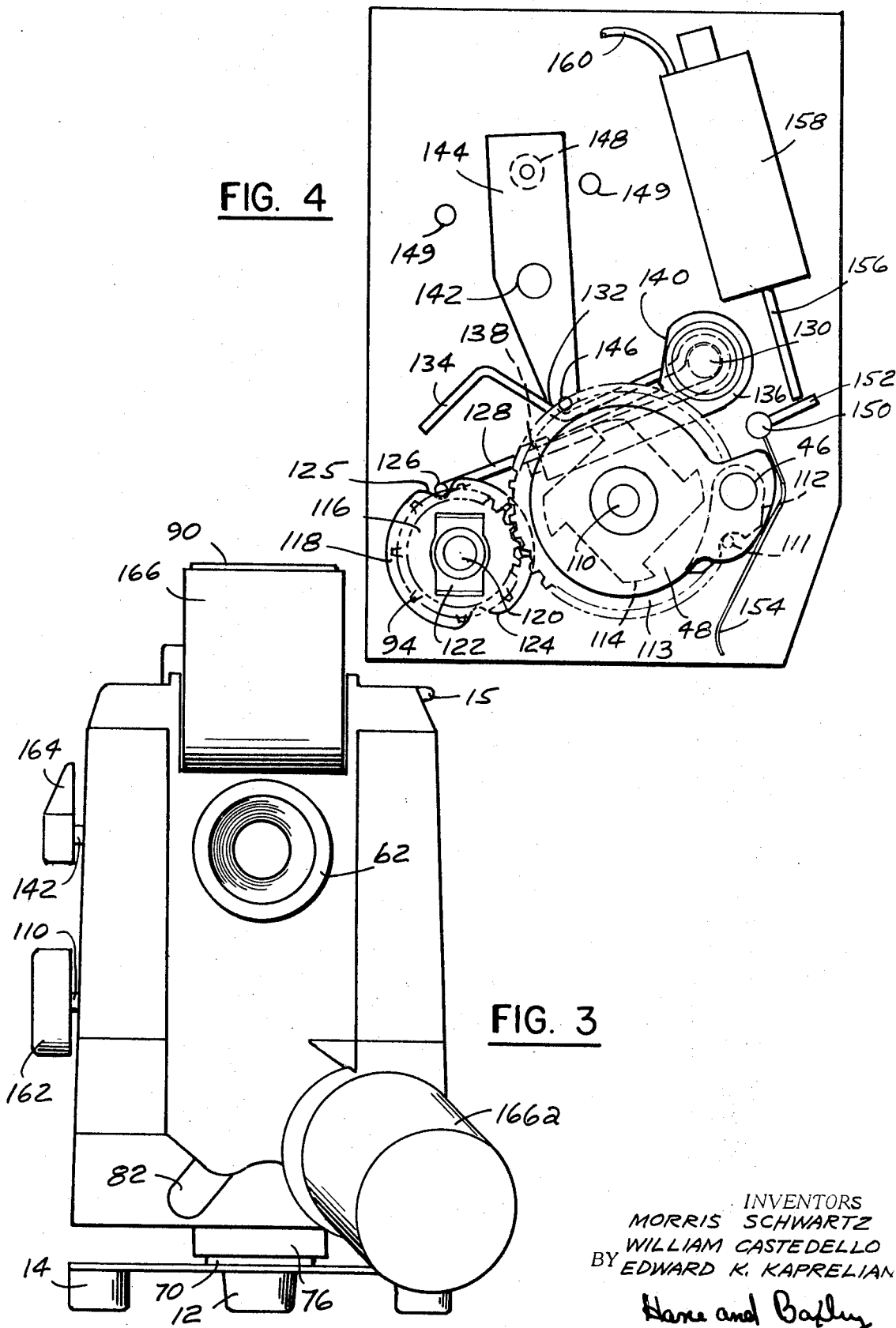

INVENTORS
MORRIS SCHWARTZ
WILLIAM CASTEDELLO
BY EDWARD K. KAPRELIAN

ATTORNEYS

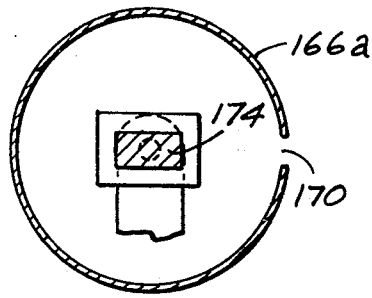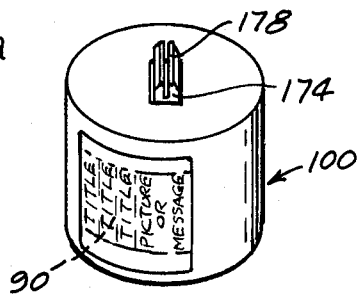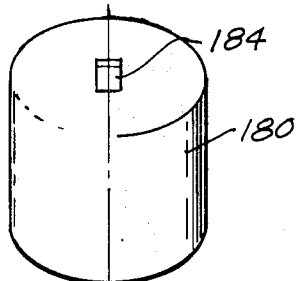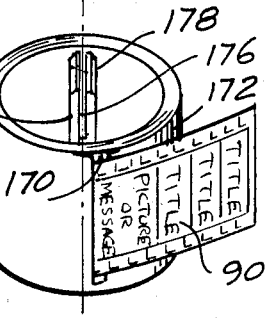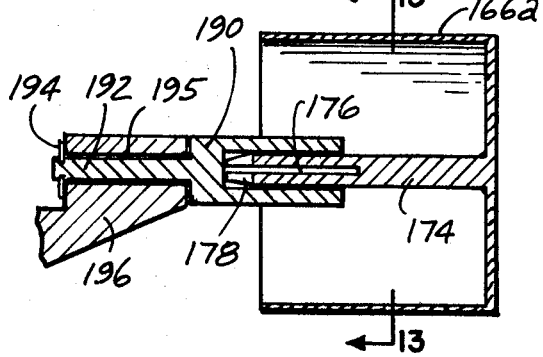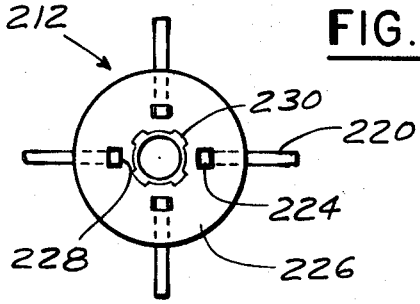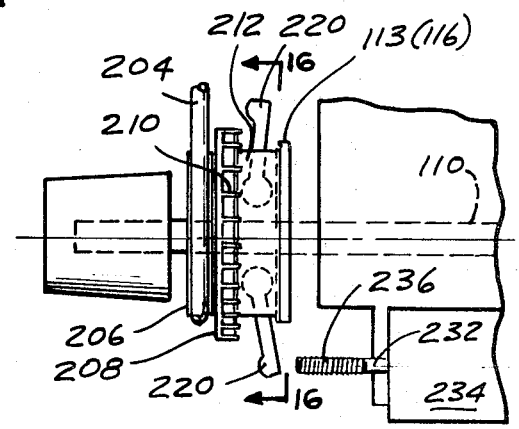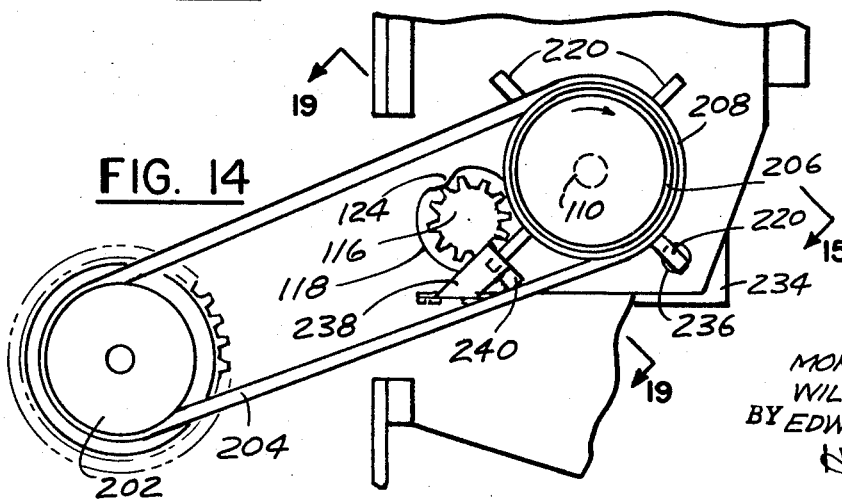

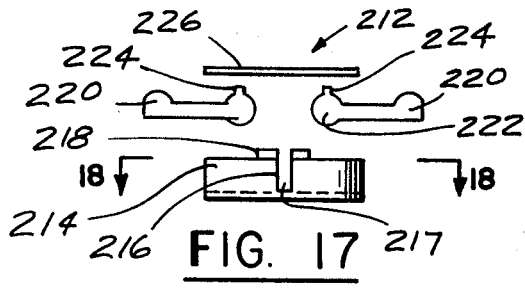
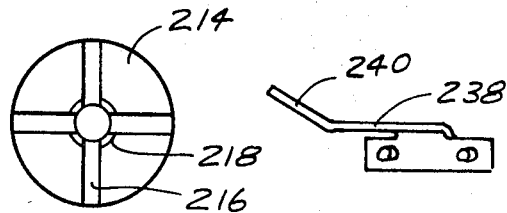
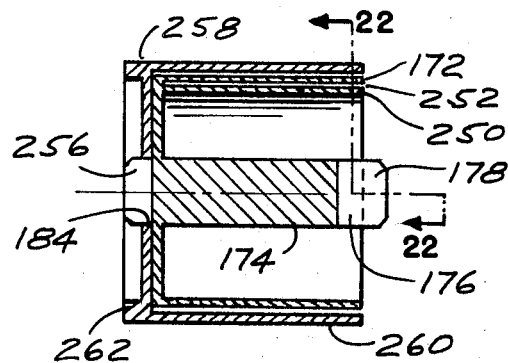
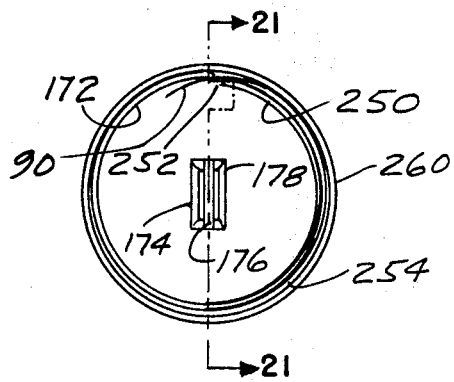
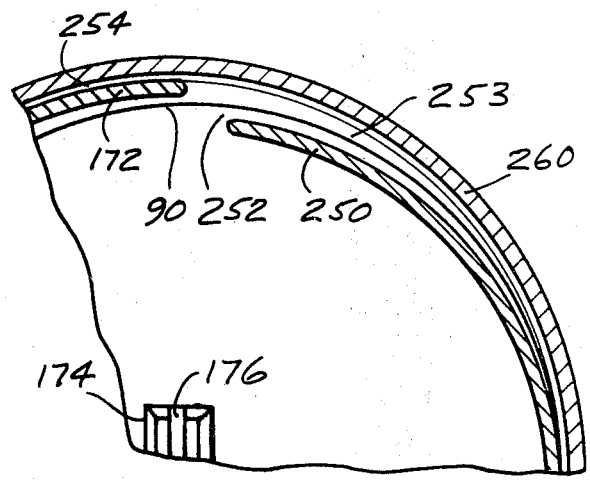

United States Patent Office 3,516,739
Patented June 23, 1970

3,516,739
STRIP FILM PROJECTOR
Morris Schwartz and William Castedello Plainville, Conn., and Edward K. Kaprelian, Joppa, Md., assignors to The Kalart Company Inc., Plainville, Conn., a corporation of New York
Filed Aug. 11, 1967, Ser. No. 659,966
Int. Cl. G03b 1/48, 1/50, 1/52
U.S. Cl. 353—95                                    12 Claims

ABSTRACT OF THE DISCLOSURE

A strip film projector for projecting still pictures frame-by-frame. The projector permits accurate and convenient positioning of successive picture frames in the projection gate of the projector either by manual or remote operation. The projector has the capability of releasing the film strip from the film transport mechanism of the projector for rapid and safe reverse movement of the film strip or for pulling through action. The projector is provided with a storage container or can in which the film after passing through the projector is received rolled up ready for reprojection without rewinding. The container or can is self-labeling thereby correctly identifying the film in the can.

---

This invention relates to an improved strip film projector and is concerned with visual presentation of successive picture frames on a strip of film. Projectors according to the invention are equally useful for training, teaching advertising, or home entertainment use.

One of the objects of the invention is to provide a compact, lightweight projector having the capability of either manual or remote operation to effect rapid and automatic frame change.

Another object is to provide an improved film feeding arrangement in which accurate positioning of the picture frame in the gate is readily achieved and with which the film strip can be released from the feeding means to permit either rapid and safe reverse of the film strip or pull-through action as required.

Still another object is to provide a film take-up arrangement in which the film is received after projection in such a manner as to eliminate rewinding prior to reprojection.

Still another object is to provide means for receiving the film, after projection, in its original storage container or cassette.

Still another object is to provide a storage container or cassette for the film which is self-labeling and which correctly identifies any film which it receives.

These and other objects and advantages will become more fully apparent from the specification and the drawings in which:

FIG. 2 is a plan view of the projector shown in FIG. 1;

FIG. 3 is a front elevational view of the projector of FIG. 1;

FIG. 4 is an enlarged view of part of the film advance mechanism of FIG. 1 shown in its normal position;

FIG. 5 is a front view of part of the mechanism shown in FIG. 4;

FIG. 5A is a section taken on line 5A—5A of FIG. 5;

FIG. 6 shows the mechanism of FIG. 4 at the start of the advance stroke;

FIG. 9 is a fragmentary view of the projector as shown in FIG. 1 with the outer cover in place;

FIG. 10 is a view of the film container with the cover in place;

FIG. 11 shows the container of FIG. 8 in separated condition;

FIG. 12 shows the film receiving container in operating position;

FIG. 13 is a view of FIG. 12 along line 13—13;

FIG. 14 shows a fragmentary view of an alternative means for operating the film drive;

FIG. 15 is a view along line 15—15 of FIG. 14;

FIG. 16 is a view of the pawl assembly taken on line 16—16 of FIG. 15;

FIG. 17 is a partial exploded view of FIG. 16;

FIG. 18 is a view taken on line 18—18 of FIG. 17;

FIG. 19 is a view along line 19—19 of FIG. 14 of the restoring cam as it would be seen in the direction of arrows 15—15;

FIG. 20 is a view of another form of the film container;

FIG. 21 is a cross-sectional view of the film container of FIG. 20 taken on line 21—21; and FIG. 22 is an enlarged cross-sectional view of the upper right quadrant of FIG. 20 taken on line 22—22 of FIG. 21.

Figure 1:
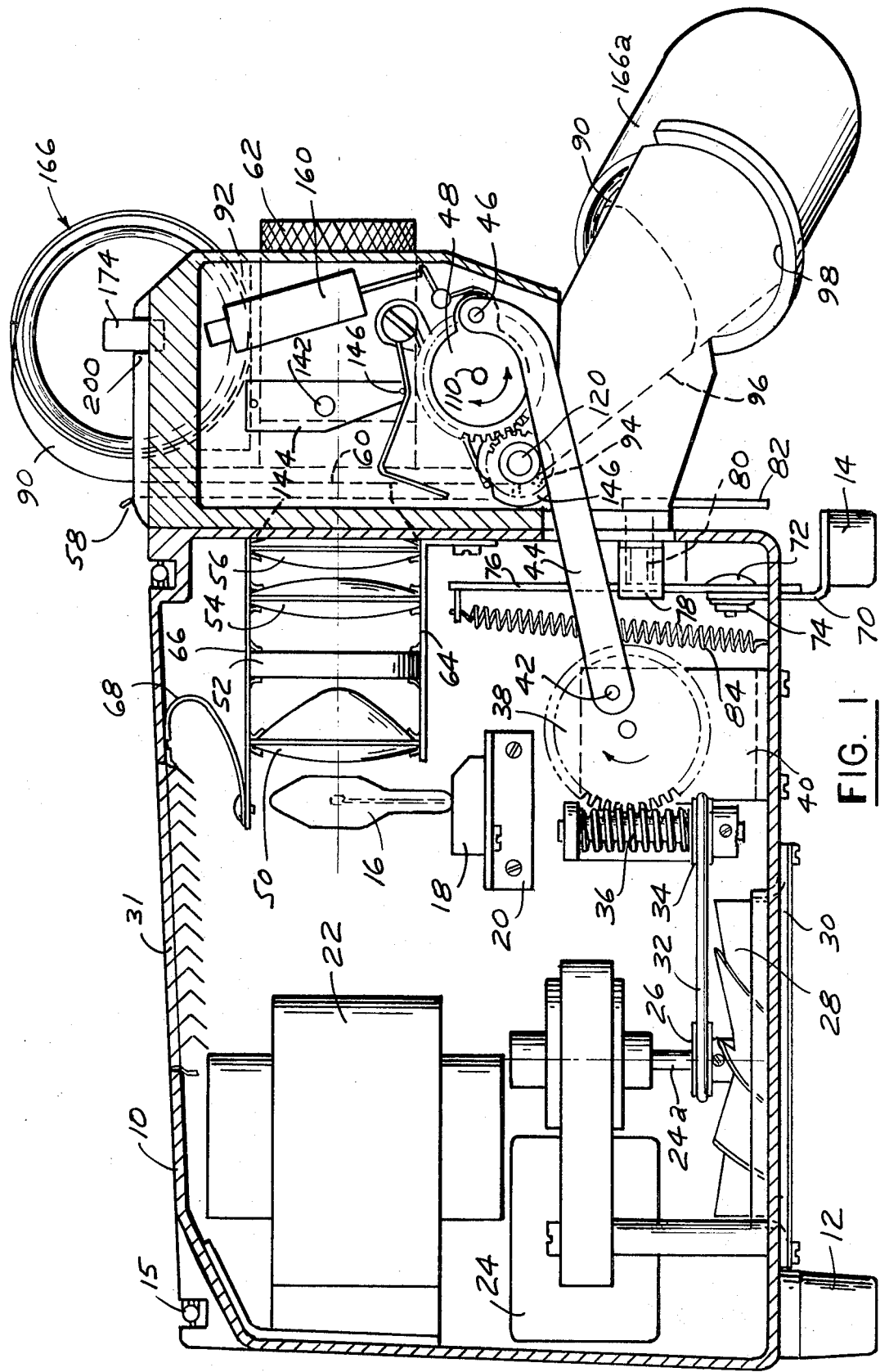
FIG. 1 shows in partial side elevational cross-section one embodiment of the invention.

As shown in FIG. 1, the exemplified projector comprises a casing 10 made preferably of metal or thermosetting plastic and supported on a rear foot 12 and a pair of pivoted front feet 14. A folding handle 15 for carrying the projector is pivoted on pins at the top of the body as shown. Contained within the casing is a high efficiency lamp 16, preferably of the low valtage, quartz envelope type, carried by a socket 18 supported on a bracket 20. Power for the lamp is provided by a transformer 22 through suitable wiring, not shown. Power to the transformer and to a motor 24 is provided from a conventional outlet through the customary switch and power cord, not shown.

The shaft 24a of motor 24 carries a pulley 26 and a fan 28, the latter drawing air upward through a screened opening 30 for cooling the motor 24, transformer 22 and lamp 16. Air is exhausted through a louvered grill 31 at the top of casing 10. A belt 32 carries power from a pulley 26 on shaft 24a to a second pulley 34 to which is connected a worm gear 36 of metal or suitable plastic such as nylon. Pulley 34, a worm 36 and a coacting gear 38 are mounted on a supporting bracket 40 which, though shown fastened to the base of casing 10 may be formed as an integral part thereof. Gear 38 carries a crank pin 42 engaged by a crank arm 44 the other end of which engages a crank pin 46 carried on a disc 48. The pin and crank arrangement is such that as pin 42 rotates clockwise, pin 46 and thus disc 48 are oscillated through an arc in excess of 90 degrees, preferably in the range of 100 to 115 degrees. The function of oscillating disc 48 is to advance film 90 in a manner to be described in connection with FIGS. 4 and 5.

Light from lamp 16 is received by a first condenser 50 which may be aspheric in form and is preferably made of a heat resistant glass such as Pyrex. The light passes successively through a heat absorbing filter 52 and condensers 54 and 56 on its way past an opening in a spring pressed pressure plate 58 to a film gate 60 and a projection lens 62. The condenser optics may be carried in axial alignment by any convenient means such as a lower bracket part 64 and an upper retainer portion 66 held in place by a spring 68.

The projector may be adjusted for both height (elevation) and tilt (rotation) by means of front legs 14 which are carried on a bracket 70 pivoted around a horizontal axis formed by a rivet or bolt 72. A spring pressed washer 74 provides moderate frictional tightness at the head of the rivet which is also attached to a vertical arm 76. This arm is slidably fitted into a bracket 78 the forward end of which is threaded to receive a screw 80 carried by a lever 82. Arm 76 is normally urged into a downward direction by a spring 84 the lower end of which is fastened to the bottom of casing 10. To adjust for tilt, it is only necessary to rock the projector from side to side, bracket 70 rotating about rivet 72 in the process. When the tilting pressure is removed, the projector casing stays in the tilted position because of the friction provided by washer 74. To adjust for height, lever 82 is first rotated in a counter clockwise position in the view of FIG. 3, whereby screw 80 releases its locking pressure against arm 76. The projector front is then pushed down or allowed to lift in response to the action of spring 84 as necessary, to achieve the correct elevation whereupon lever 82 is rotated clockwise to its locking position. The two adjustments can be made conveniently and are independent of each other.

The film 90 to be projected is fed to gate 60 from the top front of the projector where it is held in a well 92 either in the form of a loose roll, or in the form of a roll in a slotted cylindrically shaped container portion 166 detachably supported on the casing 10 secured against rotation as will be described further below. Spring pressed pressure plate 58 holds the film in the gate; the film may be additionally restrained between glass plates at gate 60 and the pressure plate, if desired, to insure against buckling and thereby resulting out-of-focus projection. The film is advanced by means of a sprocket 94 driven in a manner to be described.

After passing sprocket 94, film 90 enters a channel 96 which curves approximately in the manner shown, terminating in a somewhat bell-shaped, open-ended half-tube 98. The film, partly curley or twisted, is received in a second cylindrically shaped container 166a which is detachably connected to a rotating bearing mounted on the casing as will be more fully described in connection with FIGS. 12 and 13. This arrangement permits container 166a to rotate about its longitudinal axis. The angle of attack of the film when entering the container is chosen so as to cause the container to rotate about its bearing and continue to receive the film in a manner such that the head of the film remains lying against the inside wall of the container while the remainder of the film is being wound up inwardly, that is, spirally approaching the center axis of the container, or in other words the tail of the film assumes a postion nearest the center axis of the container. This arrangement, which permits the film received in the container to be subsequently reshown by feeding from the outside of the roll without rewinding, is well known in the prior art and requires no further description.

FIGS. 4 and 5 show on an enlarged scale a portion of film feed mechanism in its normal projecting condition, crank arm 44 and other parts being omitted for purpose of clarity. Disc 48 is fastened to a shaft 110 and crank pin 46 mounted on the disc carries a pivoted pawl 112 which normally hangs free as shown in FIG. 4 by force of gravity, or may be yieldably held in such a position by means of a spring if preferred. The pivotal movement of the pawl is limited by a pin 111 which engages a notch in the pawl. Rotating freely on shaft 110 is a gear 113 to which is fastened a four-sided ratchet wheel 114, the teeth of which are designed to be engaged by pawl 112 in a manner to be described. Gear 113 meshes with a second gear 116 having half the number of teeth as gear 113. Gear 116 is attached to a cam plate 118 and is carried on a shaft 120.

As is shown in FIGS. 5 and 5A, shaft 110 fixedly supports at its end opposite to gear 113 a gear 113A which meshes with a gear 116A pinned to shaft 120. This shaft mounts sprocket 94 and also a pressure pad 119 and a spring 122 as seen in FIG. 5. The gear-cam unit 116–118 is pressed against pressure pad 119 by spring 122.

Accordingly, torque imparted to shaft 110 either by action of rachet 114, to be described, or by manual operation by means of a knob 162, to be described, will cause film 90 to move due to the sequential action of gears 113A and 116A, shaft 120 and sprocket 94.

Cam plate 118 has a pair of notches 124 and 125 which are located 180 degrees apart. One of said notches is shown engaged by a fingerlike end 126 on a spring 128 which is bent about and carried by a post 130 without restraint. The spring is formed with a detenting portion 132 continued by an L-shaped portion terminating in a flat end 134. Also carried by post 130 is one end of an arm 136 which is provided at its outer end with a notched finger 138 which engages spring 128 at a point approximately midway between end 126 thereof and post 130. In addition, arm 136 is provided with a flattened cam-like portion 140 as shown.

A selector shaft 142 carries a plate 144 having a squared lower end mounting a pin 146 and at the other with a bearing button 148 which may be made of nylon or other suitable material. In the position shown in FIG. 4, pin 146 engages detenting portion 132 of spring 128, thus ensuring that spring end 126 is firmly engaged with notch 125. In the settings shown in FIGS. 7 and 8 button 148 may engage one of two shallow cavities 149 for correct positioning.

Carried on the same wall portion 10a of casing 10 as the other components is a pivot 150 which carries a rigid arm 152 and a spring-like arm 154 as shown. Arm 152 is pivoted downwardly by the action of a plunger rod 156 of a solenoid 158 when the latter is actuated through wires 160 and a switch and a power source, not shown.

Manual rather than solenoid actuation of the film advance can be effected by rotation of knob 162. When the mechanism is in its normal operating position as shown in FIG. 4, the film may be advanced or reversed by turning knob 162 while retaining correct frame registry in the projection gate 60.

In order to advance the film to the next frame, solenoid 158 is temporarily energized by the operator through a switch which may be at the end of a cord of any convenient length. Upon energization of the solenoid, plunger 156 rotates pivot 150 clockwise via arm 152 thereby moving spring arm 154 to the left and hence into engagement with pawl 112 which is thus moved toward the ratchet wheel 114. Pawl 112 engages one of the notches of the ratchet wheel, as is shown in FIG. 6, when crank arm 44 reaches the point in its cycle in which pin 46 causes disc 48 to begin its clockwise cycle. The motor has a reduction such as to cycle arm 44 and disc 48 approximately one to two times per second. As shown in FIG. 6, the clockwise rotation of ratchet wheel 114 causes gears 113 and 116 to rotate. The force transmitted by the gears to cam plate 118 lifts finger 126 out of notch 125 and onto the periphery of cam plate 118. At the end of the stroke of pin 46, which results in a 90 degree rotation of gear 113 and a 180 degree rotation of gear 116 and with it of sprocket 94, finger 126 falls into the notch 124 thereby holding the sprocket 94 and film 90 engaged by the sprocket in their new positions and the pawl becomes disengaged from the ratchet wheel. The number of teeth on sprocket 94 are so chosen as to cause the film to be advanced one frame for each half turn of the sprocket shaft 120, i.e., eight teeth for a four perforation frame. Arm 44, disc 48 and pawl 112 continue with the cycle, repeating their idling motions until re-energization of solenoid 158 results again in re-engagement between pawl 112 and ratchet wheel 114 to cause advancement of the film to the next frame.

Figure 7:
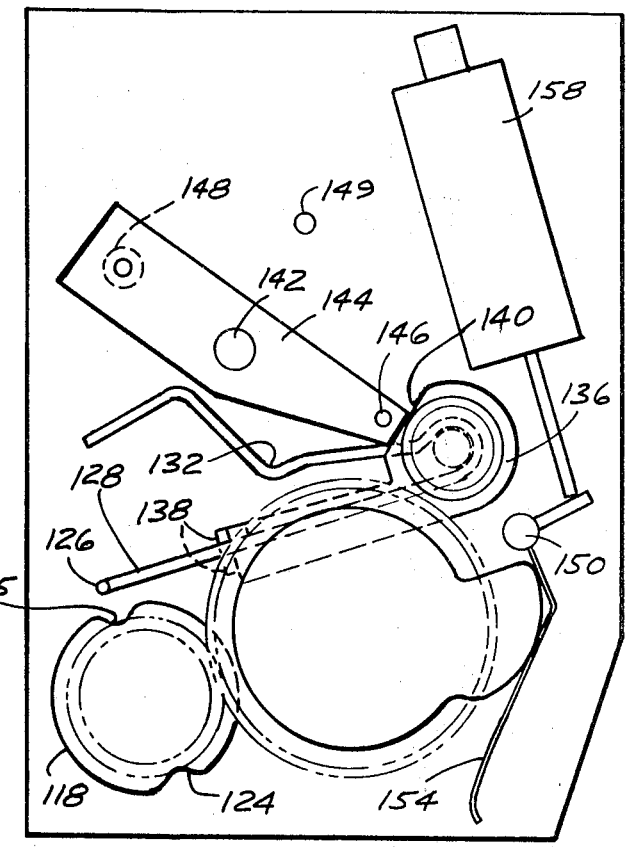
FIG. 7 shows the mechanism of FIG. 4 set to the free-sprocket condition.

If it is necessary or desired to free the sprocket feed mechanism for any reason, for instance to pull film rapidly through the projector, shaft 142 is rotated by means of a knob 164 (FIG. 9) to the counter-clockwise position shown in FIG. 7. In this position pin 146 rides out of detenting portion 132 of spring 128 thereby relieving the pressure of finger 126 in notch 125. In addition, the squared lower end of plate 144 engages flat cam portion 140 of arm 136, causing it to rotate clockwise and lifting finger 126 away from notch 125 in cam plate 118. When shaft 142 is restored to its initial position, the parts are re-engaged as shown in FIG. 4, either directly or at the end of the next fractional stroke of pawl 112.

Figure 8:
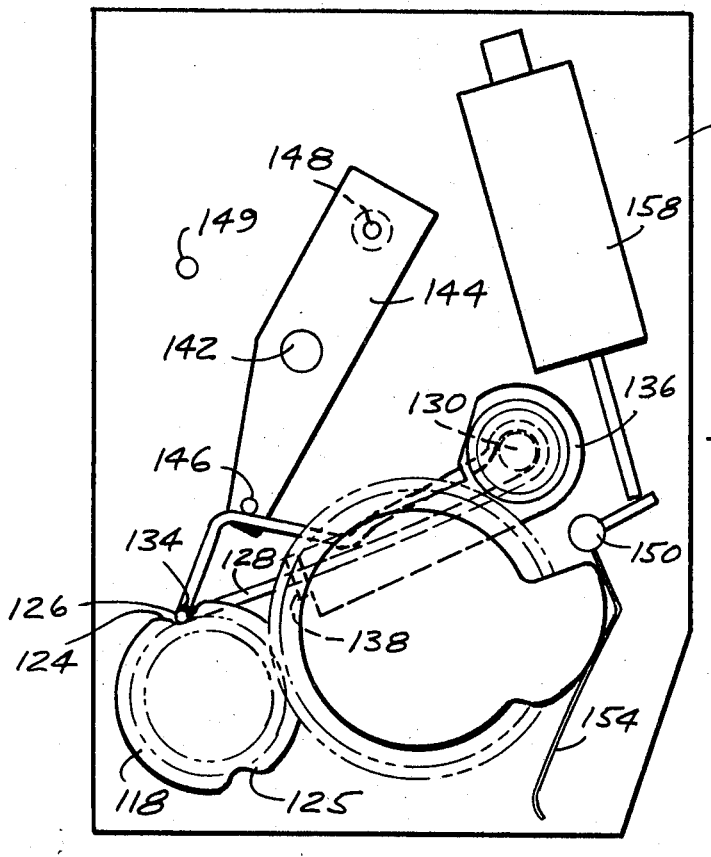
FIG. 8 shows the mechanism of FIG. 4 set to the locked-sprocket condition.

If it should be necessary to reposition a frame in the projection gate 60, shaft 142 is rotated to a clockwise position as shown in FIG. 8. This causes pin 146 to force down the L-shaped portion of the spring 128 until its end 134 is brought down on top of finger 126. When locked in this position, finger 126 and spring end 134 prevent cam plate 118, gear 116 and gear 113 from being rotated. Subsequent rotation of shaft 110 by means of a knob 162 secured to shaft 110 repositions sprocket 94 and film 90 as desired via gears 113 and 116, this action being permited by the slippable friction coupling established by spring 122. After reframing, shaft 142 is restored to its initial position and finger 126 continues to maintain the proper position of the film in the gate during the course of repeated cycles.

Gears 113A and 116A are correlated with gears 113 and 116 so that the framing can be set to agree with detent 124 or 125 in cam 118 and then be used as the drive means while synchronism is maintained between cam 118 and ratchet 114.

Cam 118 and with it ratchet wheel 114 are in "frame" position but restrained from turning by a locking pin 126 while pressure pad 119 is caused to rotate frictionally relative to cam 118 when the strip film 90 is moved.

As is now evident, during normal operation of the projector, that is, when the film 90 is pulled through the projector, frame by frame, by the power drive all four gears 113, 113A, 116 and 116A, and hence also sprocket 94 and cam 118 rotate as a unit. Only during reframing there is a relative displacement between sprocket 94 and cam 118.

An alternative means for driving the film advance mechanism is shown in FIGS. 14 to 19. The modification according to these figures has over the reciprocating link drive of FIG. 1 the advantages of an immediate response to a demand for a frame change and of a positive single frame action. In this modification, pin 42, crank 44, pin 46, disc 48 and ratchet wheel 114 are eliminated. Gear 38 carries a pulley 202 which drives a belt 204 which in turn drives a pulley 206. Attached to pulley 206 is a ratchet plate 208 which together with pulley 206 rotates freely on shaft 110. Ratchet plate 208 is provided with turned-in teeth 210 as shown.

Gear 113 has affixed to it a pawl assembly 212. Both the gear and the pawl assembly rotate about shaft 110. As shown in FIGS. 15, 16, 17 and 18, pawl assembly 212 includes a base 214 which is provided with four radial slots 216 and four shallow upwardly directed projections 218. Each of the slots carries within it a pawl 220. The inner end of each pawl has a circular portion 222 and a projecting finger 224. The pawls are kept in place and restrained frictionally by a springy plate 226 which is provided with four holes 228 into which fingers 224 are received. When springy plate 226 is assembled and held in position as by peening over projections 218, such as at 230, the pawls 220 are held under presusre against the bottoms 217 of grooves 216 in base 214, that is, out of engagement with teeth 210.

When the film sprocket 94 (not shown in FIGS. 14 to 19) is in its normally stopped position, i.e., with spring end 126 resting in notch 124 or 125 in cam plate 118, the synchronization between gears 116 and 113 is such that one of the pawls is opposite a plunger 232 of a solenoid 234. In order to prevent jamming or accidental damage, the working end of plunger 232 is a short finger 236 in the form of a tightly coiled extension spring which will act to move pawl 220 when moved axially, but will yield if pushed from the side.

Located 90 degrees in a clockwise direction from solenoid 234 is a restoring cam 238. Cam 238 is provided with a raised releasing or restoring cam portion 240 which is engageable with the ends of pawls 220 to return the same to a non-operating position, that is, a position disengaged from teeth 210, in a manner to be described.

When a frame change is desired, solenoid 234 is energized and as a result, spring plunger 236 pushes pawl 220 from the solid line position of FIG. 15 into the dotted line position. Pawl 220 is now immediately engaged by one of teeth 210, and thereupon pulley 206, ratchet plate 208, pawl assembly 212 and gear 113 rotate as a unit. Gear 113 rotates gear 116, plate 118 and the film sprocket 94 (not shown in FIGS. 14–19) in the same manner as described in connection with FIGS. 1, 4, 5 and 6. When gear 113 and pawl assembly 212 have rotated through 90 degrees, restoring cam 238 presses the previously activated pawl out of engagement with teeth 210. Pulley 206 and ratchet plate 208 continue to rotate while gear 113 and the pawl assembly come to a stop as a result of the action of one of notches 124 or 125 in plate 118 as in FIGS. 4, 5 and 6.

No further film advance is possible until solenoid 234 is again energized. If solenoid 234 is kept energized during the film advance operation or it is re-energized before the cycle is complete, there is no stoppage or interference. The springy finger 236 of plunger 232 is merely bent out of the way by one of the pawls 220 when it comes to rest at the end of the cycle. After solenoid 234 is de-energized, springy plunger finger 236 is restored to its normal position by the usual retracting spring of the solenoid, not shown. The friction produced by the pressure of springy plate 226 is sufficient to retain the pawls 220 in the position called for either by solenoid 234 or cam 238. Deliberate mis-setting of pawls is automatically corrected by the mechanism.

The film to be projected is carried in the container 100 as shown in FIGS. 10 and 11. FIG. 10 shows a filled container in its closed position and FIG. 11 shows the container with the cover removed. The container body consists of an inner, generally cup-shaped portion 166 with a cylindrical wall 172, preferably made of a suitable plastic, which carries within the film 90. Wall 172 is provided with a lengthwise slot 170 through which the title end or head of the film may be extended for a distance of one or two inches. The wall of the container is preferably colored rather than being either clear or black in order to provide a contrasting background color for the film for a purpose to be explained. The portion 166 is provided with an axial post 174 of rectangular, cross-section which is integral at one end with the bottom of portion 166 and is preferably made of the same plastic material as a one-piece part. The end of axial post 174 is slotted as at 176 and bevelled as at 178.

A cover 180 for container portion 166 is cylindrical in shape with one closed end 182 as shown. The closed end is provided with an axially centered rectangular slot 184 somewhat larger in size than the cross-section of axial post 174. When the cover is closed over portion 166, the end of post 174 extends through slot 184 and slightly beyond cover end 182.

In normal storage a short length of the head end of the film strip protrudes beyond slot 170. This length carries the film strip title, number, and any other required information, including the first frame if desired. When cover 180 is nested upon container portion 166 the short length of film is held against the contrasting background of colored wall 172 of the container portion, and the information carried thereon is easily read through the transparent wall of cover 180. Thus, the film end becomes automatically the correct label for any container in which it is placed, and matching of film and container becomes unnecessary.

In use, cover 180 is removed and the filled container portion 166a is placed atop the projector as shown, with the end of post 174 engaging a corresponding notch 200 at one side of the film receiving well 92 so that the container portion is secured against rotation. The head end of the film is pulled out somewhat further from the slot and fed into the film gate 60 at the forward surface of pressure plate 58, far enough so that its perforations are engaged by the teeth on sprocket 94. After solenoid 158 has been energized once or twice the film begins to enter the curved channel 96. The other empty container portion 166a is held rotatably at the exit of the chute as shown in order to receive the film in the manner heretobefore described. If desired, the film can be removed from container portion 166a, placed in the cavity 92 as a free roll and the now empty container portion placed in the receiving position thereby obviating the need for a second container portion.

The construction of the container attachment is shown in FIGS. 12 and 13. The end of post 174 is received in a sleeve member 190 and is retained therein by friction resulting from the springiness of the fork material on each side of slot 176. The other end of member 190 is formed as a shaft 192 which is received by a bearing hole 195 in a member 196 which, in turn, is part of the projector casing 10. Member 190 is held in freely rotatable condition by means of a washer 194, cotter pin or similar fastener.

As shown in FIGS. 20, 21 and 22, it is possible and sometimes preferable to modify the film container to automate the self-labelling feature thereof. In the modification of FIGS. 20, 21 and 22, the container has a body wall 172 which is cylindrical for approximately 270°. At this point it spirals inwardly as at 250 to produce a slot 252 which is substantially tangential, in contrast with slot 170 of FIG. 11 which is essentially radial. As the leading edge of the film 90 enters the container from the film channel 96, it passes through tangential slot 252 and moves into a passageway 253 of gradually decreasing width between the outer surface of wall 250 and the inner surface of a side wall 260 of a cover 258. A positive stop 264 for the film strip may be provided at the inner end of the passageway. After the film has moved through an arc of approximately 90 degrees past slot 252 the width of the passageway has decreased to a selected width, usually between 8 and 15 thousandths of an inch. This action is shown at an enlarged scale in FIG. 22. At this point there is sufficient friction between the film and the container to start the latter rotating and film takeup proceeds as previously described. The cover of the modification according to FIGS. 20, 21 and 22, is held on the container body, but in inverted position as shown, being retained on the body by means of frictional engagement with a slotted extension 256 of post 174 which protrudes through the bottom of the container and engages slot 184 in the cover. Extension 256 is similar in construction to the slot 176 and bevel 178 arrangement at the long end of post 174.

Cover 258 is provided with a rim 262 which permits the container to stand steadily on the cover when the latter is either in the position shown in FIG. 21, or in the normally closed position.

It is obvious that by having the film pass through slot 252 it is not necessary to "fish" for the film end and to thread it through the slot as would be the case if the slot were radial as shown in FIG. 11. It is only necessary that the cover 258 be unsnapped from the position shown in FIG. 21 and slid onto level 178 of post 174 to restore the film into condition for re-showing.

While the invention has been described in detail with respect to certain now preferred examples and embodiments of the invention, it will be understood by those skilled in the art, after understanding the invention, that various changes and modifications may be made without-departing from the spirit and scope of the invention, and it is intended, therefore, to cover all such changes and modifications in the appended claims.

What is claimed is:

1. A projector for projecting still pictures on strip film frame by frame, said projector comprising in combination:

a casing including a projection gate;

optical means for projecting a picture in registry with said gate;

guide means guiding a strip of film inserted in the guide means from a supply station past said gate to a take-up station;

transport means for moving the strip of film, frame by frame, from the supply station to the take-up station, said transport means including power drive means continuously activated when the projector is operational, a film advancing rotary drive member engaging the strip of film and arranged to be driven by said power drive means to advance the strip of film along said guide means, and a driven member continuously reciprocated by said power drive means within a predetermined angular range;

self-releasing coupling means movable into a position coupling said power drive means to said drive member in response to an actuation of the coupling means and releasing the drive member from the power drive means upon movement of the drive member through a distance corresponding to an advancement of the film strip by one frame;

actuating means coacting with said coupling means to actuate the same for coupling the power drive means to the drive member;

transmission means between said power drive means and said film advancing rotary drive member to transmit the movement of said continuously driven reciprocating member to said drive member, said coupling means including a coupling member included in said transmission means and movable between a first position rendering the transmission means operative for the aforesaid purpose and a second position rendering the transmission means inoperative, said coupling member being biased into said second position; and release means coacting with said coupling member to move the same from the first position into the second position when the drive member had advanced the strip film by one frame, operation of said actuating means moving said coupling member from the second position into the first position.

2. A strip film projector according to claim 1 wherein the said film strip advancing rotary drive member is a sprocket seated on a rotary shaft, and wherein said transport means further comprises a first gear rotatable coaxially with said reciprocating rotary member, a second gear mounted coaxially with said sprocket and rotatable on said shaft, slippable friction means coupling said second gear to said sprocket shaft, said second gear being in mesh with said first gear, and when in said coupling means further comprises a ratchet wheel secured to said first gear for rotation in unison therewith, said coupling member comprising a pawl movable into engagement with said ratchet wheel for rotation of said wheel and said first gear thereby rotating said sprocket shaft by said gears when and while said reciprocating rotary member is rotated in one of its rotational directions, operation of said actuating means moving said pawl into engagement with said ratchet wheel.

3. A strip film projector according to claim 2 and further comprising a cam plate rotatable coaxially with and in unison with said second gear, said cam plate, second gear and sprocket constituting an assembly jointly rotatable with said shaft, said cam plate including two recesses spaced in accordance with the turning angle of the assembly required to advance the strip film by one frame and yieldable detent means engageable with either of said recesses, said detent means being dislodged from an engaged recess at the beginning of the rotation of the assembly and engaging the other recess after turn of the assembly through an angle corresponding to the spacing of the recesses thereby arresting the sprocket, engagement of said other recess causing the cam plate and the second gear to slip in reference to the shaft thereby arresting turning of the sprocket.

4. A strip film projector according to claim 3 and comprising manually operable means movable into and out of a position forcing said detent means out of engagement with the respective one of said recesses, thereby freeing the film strip for manually pulling the same through said guide means independent of said power drive means.

5. A strip film projector according to claim 3 and comprising manually operable film strip reframing means, said reframing means including locking means movable into and out of a position locking said detent means in the respective recess thereby preventing rotation of said cam plate and said gears by said power drive means, and actuating means coacting with said first gear to rotate the same thereby rotating the sprocket via said gears, said slippable friction means permitting such rotation of the sprocket.

6. A strip film projector according to claim 1 wherein said transmission means further comprise a first gear coaxial with said driven member, a second gear coaxial with said film advancing rotary drive member and in mesh with said first gear, said coupling means including a member having spaced apart recesses and being secured to said driven member for rotation in unison therewith, at least one detent means supported by said first gear and movable into and out of a position engaging one of said recesses, engagement of said detent means with one of said recesses coupling said driven member to said film advancing drive member via said gears thereby transmitting rotation of the driven member to the drive member, and release means disengaging said detent means from the engaged recess after a predetermined angular rotation of the drive member, said angular rotation corresponding to the rotation of the drive member required to advance the film strip by one frame, actuation of said actuating means operating the same to move said detent means into engagement with one of said recesses.

7. A strip film projector according to claim 6 wherein said film advancing rotary drive member is a sprocket, said recessed member is a disk having on its side facing the first gear a plurality of circumferentially spaced and axially extending teeth defining said recesses between each two adjacent teeth, and said detent means is a pawl movably supported by said first gear.

8. A strip film projector according to claim 7 wherein said release means is a cam means disposed in the path of movement of the pawl in the position thereof engaging one of said recesses for disengaging the pawl from the recess upon completion of said angular rotation, and yieldable locking means coacting with said second gear to arrest the same substantially simultaneously with the disengagement of the pawl.

9. A strip film projector according to claim 8 and comprising a pawl plate mounting several circumferentially spaced and radially oriented pawls, each of said pawls being engageable with one of said recesses and frictionally restrained in the disengaged position.

10. A strip film projector according to claim 1 wherein said actuating means comprises a solenoid including a movable core biased into a position disengaged from the coupling means and movable into engagement with the same for the purpose aforesaid by an energization of the solenoid, said solenoid core having a flexible tip yielding when encountering excessive resistance of the coupling means to movement thereof into the coupling position thereby preventing damage to the coupling means in case of jamming.

11. A strip film projector according to claim 1, wherein said supply station comprises a first generally cup-shaped container for storing therein rolled-up strip film to be projected and for discharging the strip therefrom, starting with the outer end of the film strip, the receiving end of said guide means and mounting means for detachably supporting the container on the casing adjacent to said receiving end of the guide means secured against rotation relative to the casing, and said take-up station comprises a second generally cup-shaped container for receiving therein the film strip as the same emerges at the discharge end of the guide means and mounting means for rotatably supporting the container on the casing adjacent to the discharge end of the guide means; and wherein said guide means comprises a first portion defining a narrow channel guiding the film strip past the projection gate in substantially plane configuration and adjacent to the discharge end of the guide means a second portion twisted in reference to the plane of said channel so as to direct the forward end of the film strip when entering the second container against and along the wall thereof thereby coiling the film strip in the second container radially inwardly in reference to the container wall.

12. A strip film projector according to claim 11 wherein the mounting means of each of said containers comprises a post secured to the bottom wall of the respective container coaxially with the wall thereof, said post having a tip portion of non-round cross-section protruding above the rim of the container, and a receiving sleeve for slidably and detachably receiving said tip portion, each of said sleeves being mounted on the casing rotatable about its lengthwise axis.

References Cited
UNITED STATES PATENTS

| | | | |
|---|---|---|---|
| 191,554 | 6/1877 | Stanton | 206—52 |
| 2,751,815 | 6/1956 | Larson | 353—95 XR |
| 2,812,177 | 11/1957 | Kleerup | 353—95 XR |

NORTON ANSHER, Primary Examiner

R. P. GREINER, Assistant Examiner

U.S. Cl. X.R.

226—76, 134